(12) United States Patent
Kondapi et al.

(10) Patent No.: US 10,545,809 B2
(45) Date of Patent: Jan. 28, 2020

(54) DETECTION AND STORAGE OF ERRORS OF AN INFORMATION HANDLING SYSTEM UTILIZING AN EMBEDED CONTROLLER

(71) Applicant: Dell Products L.P., Round Rock, TX (US)

(72) Inventors: Srikanth Kondapi, Austin, TX (US); Nathan Francis Martell, Taylor, TX (US); Sean-Marc Paul Castruita, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 184 days.

(21) Appl. No.: 15/499,369

(22) Filed: Apr. 27, 2017

(65) Prior Publication Data
US 2018/0314578 A1 Nov. 1, 2018

(51) Int. Cl.
*G06F 11/07* (2006.01)
(52) U.S. Cl.
CPC ...... *G06F 11/0772* (2013.01); *G06F 11/0787* (2013.01)
(58) Field of Classification Search
CPC .......................... G06F 11/0772; G06F 11/2284
USPC .......................................................... 714/49
See application file for complete search history.

(56) References Cited

U.S. PATENT DOCUMENTS

| 6,502,208 B1* | 12/2002 | McLaughlin | G06F 11/0772 714/25 |
| 6,625,728 B1* | 9/2003 | Ahrens | G06F 11/2284 713/1 |
| 2003/0070115 A1* | 4/2003 | Nguyen | G06F 11/0787 714/23 |
| 2013/0179566 A1* | 7/2013 | Jreij | G06F 11/0784 709/224 |
| 2014/0195854 A1* | 7/2014 | Singh | G06F 11/2284 714/36 |

OTHER PUBLICATIONS

"Common Information Model (CIM) Infrastructure" DMTF Standard, Document No. DSP0004, Version: 2.7.0, Apr. 22, 2012, 186 pages.

* cited by examiner

*Primary Examiner* — Jason B Bryan
*Assistant Examiner* — Indranil Chowdhury
(74) *Attorney, Agent, or Firm* — Baker Botts L.L.P.

(57) ABSTRACT

In one or more embodiments, an embedded controller of the information handling system may detect an error associated with an information handling system before an operating system, executable via a processor of the information handling system, is operable to provide information associated with the error. The embedded controller may store the information associated with the error via a memory medium. The embedded controller may receive a query from operating system executing via the processor. The embedded controller may provide the information associated with the error to the operating system. In one or more embodiments, the embedded controller may detect another error after the operating system is executing and may provide providing information associated with the other error to the operating system upon detection of the other error.

18 Claims, 5 Drawing Sheets

DETECTION AND STORAGE OF ERRORS OF AN INFORMATION HANDLING SYSTEM UTILIZING AN EMBEDED CONTROLLER

BACKGROUND

Field of the Disclosure

This disclosure relates generally to information handling systems and more particularly to detecting and storing errors associated with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In the past, when an information handling system performed a power-on self-test and/or a boot sequence, any error information during the power-on self-test and/or the boot sequence would be displayed via a screen. If a user was not viewing the screen during that period, the error information would be lost. Further, after an operating system was executing, a login screen may prevent a user viewing any error information. Moreover, a playback of multiple errors was not available.

SUMMARY

In one or more embodiments, one or more systems, methods, and/or processes may detect an error associated with an information handling system before an operating system, executed via a processor of the information handling system, is operable to provide information associated with the error. Information associated with the error may be stored, and the information associated with the error may be provided to the operating system when the operating system is operable to provide the information associated with the error. Further, a query may be received from the operating system, and the information associated with the error may be provided to operating system in response to the query from the operating system. In one instance, the operating system may utilize a management information exchange, which may include a Windows Management Interface (WMI). In another instance, the operating system may utilize a management information exchange, which may include a Common Information Model (CIM). In one or more embodiments, another error may be detected after the operating system is executing, and information associated with the other error may be provided to the operating system upon detection of the other error.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, one or more errors may be detected before an operating system (OS) is executing and/or before a user logs into an information handling system (IHS). For example, the one or more errors may be detected via a power-on self-test (POST), among other diagnostics and/or system checks. For instance, information associated with the one or more errors may be lost or may not be noticed unless stored and presented after at least one of the OS is executing and the user logs in, among others. In one or more embodiments, the IHS may include a device (e.g., an embedded controller) that may receive the information associated with the one or more errors and store the information for later retrieval and/or presentation. For example, the device of the IHS may store the information associated with the one or more errors via a memory medium, receive one or more queries from the OS or an application (APP), and provide the information associated with the one or more errors to the OS or the APP in response to the one or more queries. In one instance, a playback of information associated with one or more errors and/or events may be provided to one or more of the OS and the APP, among others. In another instance, a playback of information associated with all errors and/or events may be provided via a user interface (e.g., provided to a user via the user interface). In one or more embodiments, at least one of the one or more errors may no longer exist and/or may no longer be an issue. For example, if the at least one of the one or more errors no longer exists and/or is no longer an issue, the device of the IHS may remove and/or delete information associated with the at least one of the one or more errors.

Figure 1A:
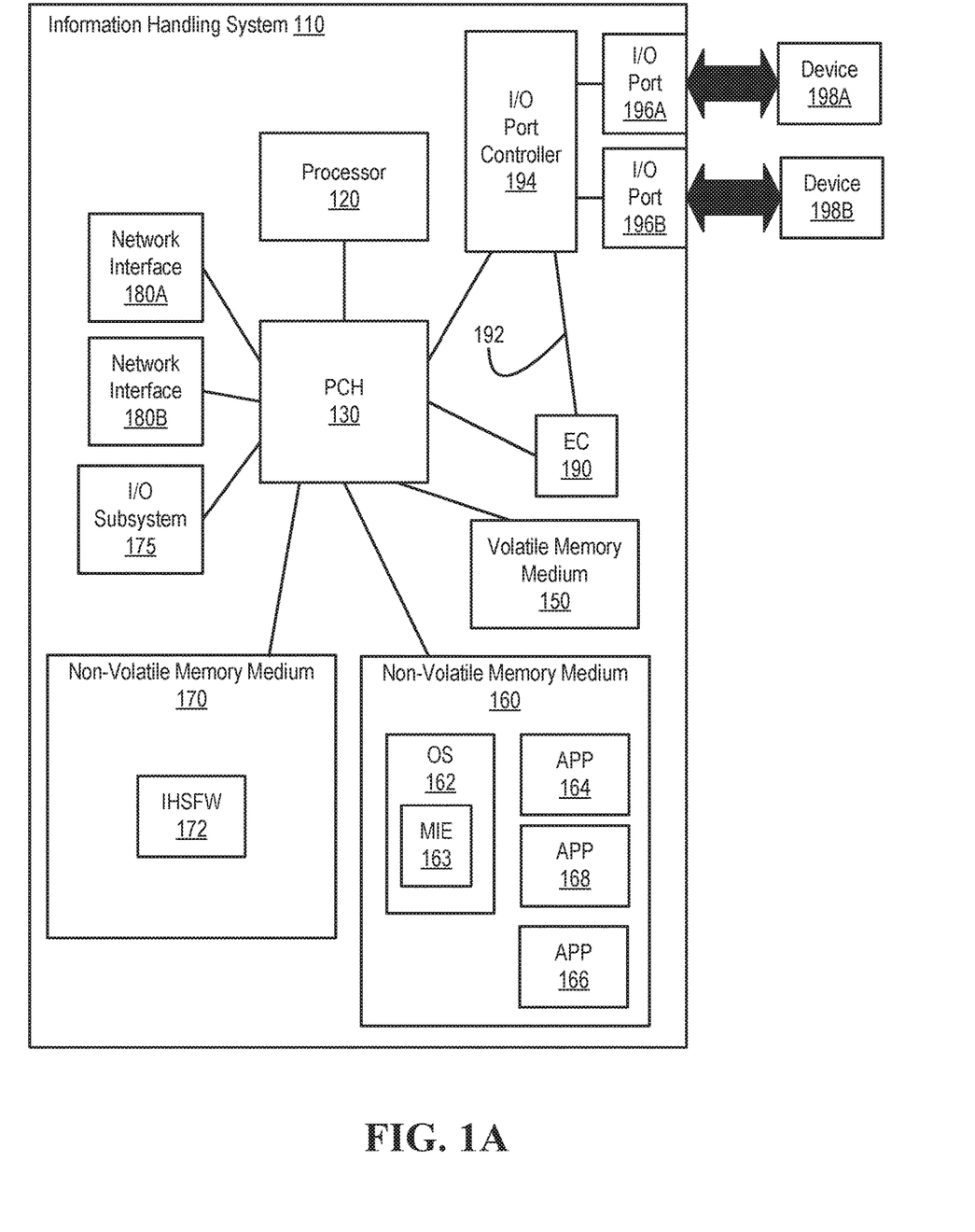
FIG. 1A illustrates an exemplary information handling system, according to one or more embodiments.

Turning now to FIG. 1A, an exemplary information handling system is illustrated, according to one or more embodiments. An IHS 110 may include a hardware resource or an aggregate of hardware resources operable to compute, classify, process, transmit, receive, retrieve, originate, switch, store, display, manifest, detect, record, reproduce, handle, or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a personal digital assistant (PDA), a consumer electronic device, an electronic music player, an electronic camera, an electronic video player, a network storage device, or another suitable device and may vary in size, shape, performance, functionality, and price. Additional components of the information handling system may include one or more storage devices, one or more communications ports for communicating with external devices as well as various input and output (I/O) devices, such as a keyboard, a mouse, and a video display, among others. IHS 110 may also include one or more buses operable to transmit communication between the various hardware components.

In one or more embodiments, IHS 110 may include firmware that controls and/or communicating with one or more hard drives, network circuitry, one or more memory devices, one or more I/O devices, and/or one or more other peripheral devices. For example, firmware may include software embedded in an IHS component used to perform tasks. In one or more embodiments, firmware may be stored in non-volatile memory, such as storage that does not lose stored data upon the loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of an embedded controller.

As shown, IHS 110 may include a processor 120, a platform controller hub (PCH) 130, a volatile memory medium 150, non-volatile memory media 160 and 170, I/O subsystem 175, network interfaces 180A and 180B, an embedded controller (EC) 190, an I/O port controller 194, and an I/O ports 196A and 196B. As illustrated, processor 120, volatile memory medium 150, non-volatile memory media 160 and 170, I/O subsystem 175, network interfaces 180A and 180B, EC 190, and I/O port controller 194 may be communicatively coupled to PCH 130, and I/O ports 198A and 198B may be coupled to I/O port controller 194. In one or more embodiments, PCH 130 may transfer information between or among two or more of processor 120, volatile memory medium 150, non-volatile memory media 160 and 170, I/O subsystem 175, network interfaces 180A and 180B, and IO port controller 194, among others not specifically illustrated.

In one or more embodiments, port 196 may be or include a type-C port. In one example, the type-C port may be or include a USB-C connector. For instance, the USB-C connector may be or include a female USB-C connector. In a second example, the type-C port may receive energy from an energy source (e.g., a battery, an energy supply, etc.). In another example, the type-C port may provide energy to a device (e.g., device 150). As illustrated, devices (e.g., type-C devices, devices with type-C connectors, etc.) 198A and 198B may be coupled to and uncoupled from respective I/O ports 196A and 196B. In one or more embodiments, device 198 may be communicatively coupled and/or mechanically coupled to port 196. In one example, contacts of device 198 may be coupled to contacts of port 196. In another example, device 198 may be physically coupled to port 196.

In one or more embodiments, EC 190 may be communicatively coupled to I/O port controller 194 via a bus 192. In one example, bus 192 may include one or more of a low pin count (LPC) bus, an enhanced serial peripheral interface (eSPI) bus, a serial peripheral interconnect (SPI) bus, and an inter-integrated circuit ($I^2C$) bus, among others. In another example, EC 190 may receive information associated with device 198 via bus 192. For instance, the information associated with device 198 may include one or more of error information and device information (e.g., device identification information, device type information, device configuration information, device capability information, etc.), among others.

In one or more embodiments, term "memory medium" may mean a "storage device", a "memory", a "memory device", "tangible computer readable storage medium", and/or "computer-readable medium". For example, computer-readable media may include, without limitation, storage media such as a direct access storage device (e.g., a hard disk drive, a floppy disk, etc.), a sequential access storage device (e.g., a tape disk drive), a compact disk, a CD-ROM, a digital versatile disc (DVD), a random access memory (RAM), a read-only memory (ROM), an electrically erasable programmable read-only memory (EEPROM), and/or a flash memory, a solid state drive (SSD), or any combination of the foregoing.

In one or more embodiments, term "memory medium" may mean a "storage device", a "memory", a "memory device", and/or "tangible computer readable storage medium". In one example, volatile memory medium 150 may include volatile storage such as random access memory (RAM), DRAM (dynamic RAM), EDO RAM (extended data out RAM), SRAM (static RAM), etc. In another example, one or more of non-volatile memory media 160 and 170 may include nonvolatile storage such as a read only memory (ROM), a programmable ROM (PROM), an erasable PROM (EPROM), an electrically erasable PROM (EEPROM), NVRAM (non-volatile RAM), ferroelectric RAM (FRAM), a magnetic medium (e.g., a hard drive, a floppy disk, a magnetic tape, etc.), optical storage (e.g., a compact disc (CD), a digital versatile disc (DVD), a BLU-RAY disc, etc.), flash memory, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example network interface 180 may enable IHS 110 to communicate over a network utilizing a suitable transmission protocol and/or standard. In a second example, network interface 180A may be coupled to a wired network. In a third example, network interface 180A may be coupled to an optical network. In another example, network interface 180B may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof, among others. In one or more embodiments, a network and its various components may be implemented using hardware, software, or any combination thereof.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an OS 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

As shown, OS 162 may include a management information exchange (MIE) 163. In one example, MIE 163 may permit multiple components to exchange management information associated with managed elements (e.g., elements of IHS 110) and/or may permit control and/or management of the managed elements. In a second example, MIE 163 may provide communicates between at least one of OS 162 and APPs 162-166 and IHSFW 172. For instance, IHSFW 172 may communicate with one or more elements of IHS 110 (e.g., processor 120, PCH 130, volatile memory medium 150, non-volatile memory media 160 and 170, network interfaces 180A and 180B, EC 190, IO port controller 194, etc.). In another example, MIE 163 may include a driver and/or a driver model that may provide an OS interface through which managed elements may provide information and/or notifications, among others. In one instance, MIE 163 may be or include a Windows Management Interface (WMI) for ACPI (available from Microsoft Corporation). In another instance, MIE 163 may be or include a Common Information Model (CIM) (available via the Distributed Management Task Force). In one or more embodiments, MIE 163 may permit communications between EC 190 and OS 162. For example, EC 190 may utilize MIE 163 in providing information to OS 162. In one instance, EC 190 may utilize at least one of WMI and CIM, among others, in providing the information to OS 162. In another instance, the information provided to OS 162 may include error information and/or event information, among others.

In one or more embodiments, EC 190 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 190 may be or include one or more of a field programmable gate array (FPGA) and an application specific integrated circuit (ASIC), among others, configured, coded, and/or encoded with instructions in accordance with one or more of systems, flowcharts, methods, and/or processes described herein.

Figure 1B:
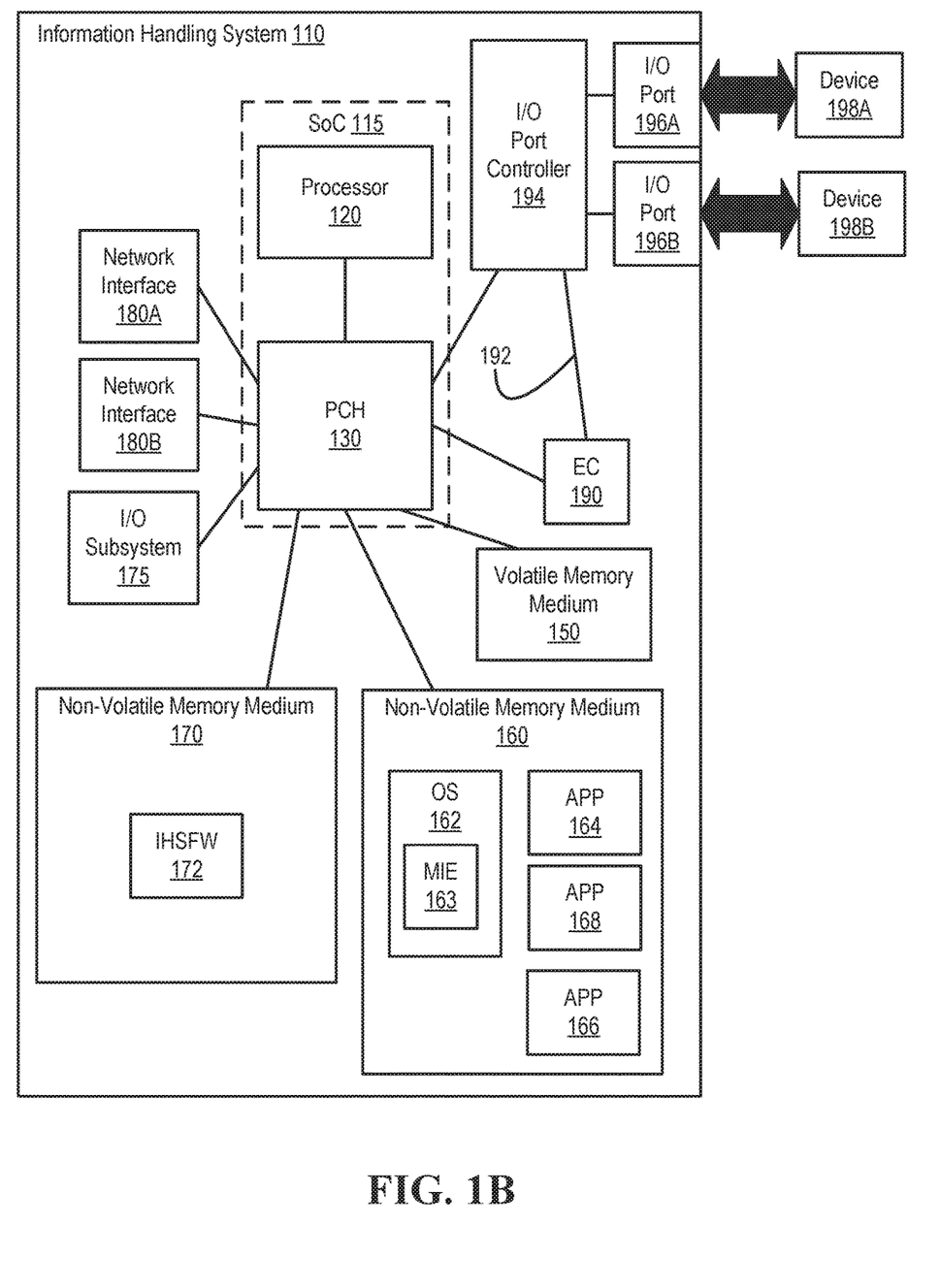
FIG. 1B illustrates an exemplary information handling system that is configured with a system-on-chip, according to one or more embodiments.

In one or more embodiments, processor 120 and PCH 130, among others, may be included in a system-on-chip (SoC). For example, as illustrated in FIG. 1B, a SoC 115 may include processor 120 and PCH 130, among others.

Figure 2:
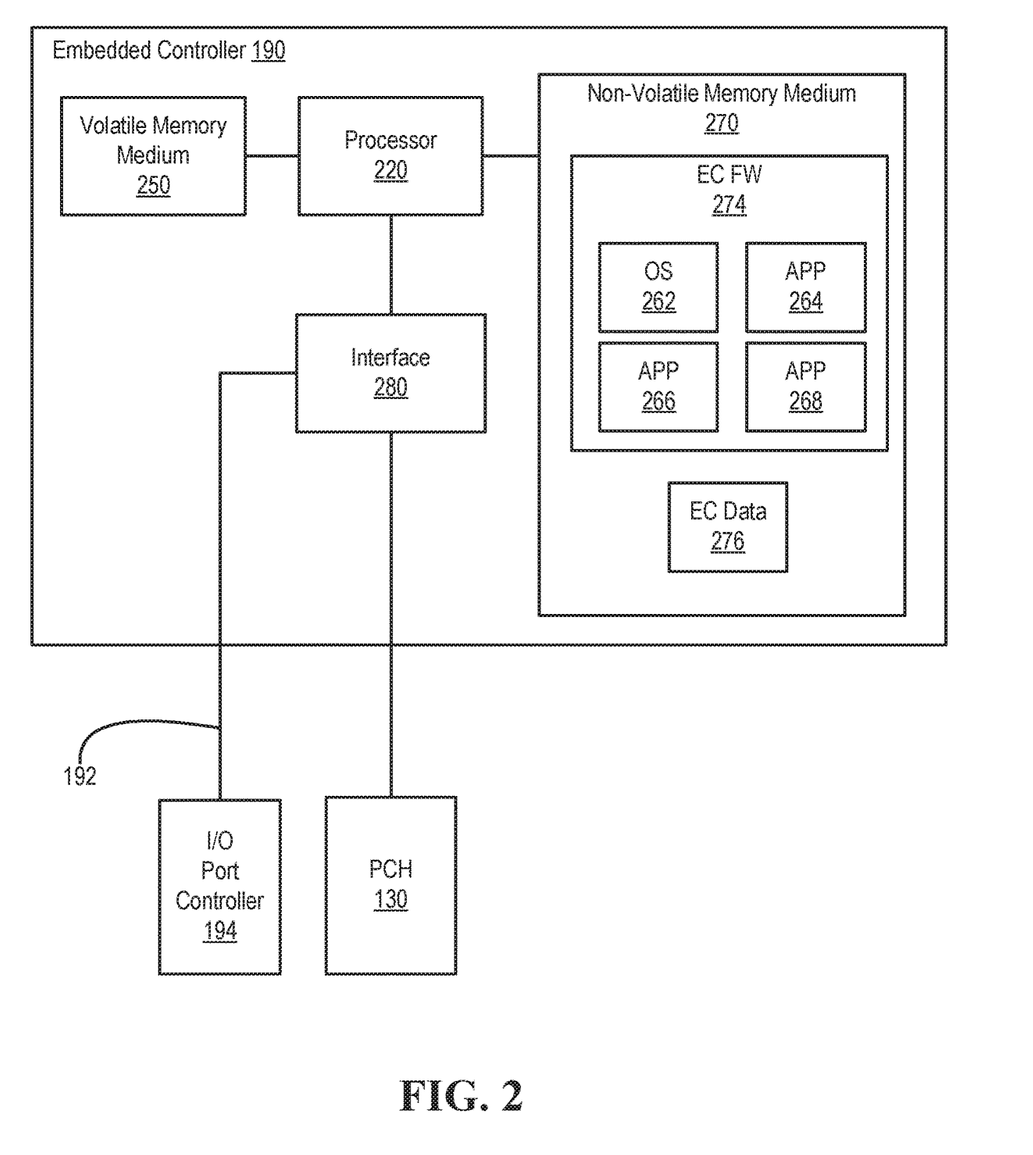
FIG. 2 provides an exemplary block diagram of an embedded controller, according to one or more embodiments.

Turning now to FIG. 2, an exemplary embedded controller is illustrated, according to one or more embodiments. As shown, EC 190 may include a processor 220, a volatile memory medium 250, a non-volatile memory medium 270, and an interface 280. As illustrated, non-volatile memory medium 274 may include an EC FW 274, which may include an OS 262 and APPs 264-268, and may include EC data 276. For example, OS 262 may be or include a real-time operating system (RTOS).

In one or more embodiments, interface 280 may include circuitry that enables communicatively coupling to one or more devices. In one example, interface 280 may include circuitry that enables communicatively coupling to one or more buses. In another example, I interface 280 may include circuitry that enables one or more interrupt signals to be received. For instance, interface 280 may include general purpose input/output (GPIO) circuitry, and the GPIO circuitry may enable one or more interrupt signals to be received via at least one interrupt line.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250.

In one or more embodiments, processor 220 may utilize EC data 276. In one example, processor 220 may utilize EC data 276 via non-volatile memory medium 270. In a second example, one or more portions of EC data 276 may be transferred to volatile memory medium 250, and processor 220 may utilize EC data 276 via volatile memory medium 250. In a third example, processor 220 may store one or more statuses via EC data 276. For instance, processor 220 may store one or more error conditions determined via a power-on self-test (POST). In another example, processor 220 may provide the one or more statuses to OS 162 that were stored via EC data 276. For instance, processor 220 may provide information associated with the one or more error conditions, determined via the POST, to OS 162.

In one or more embodiments, one or more errors may be detected before OS 162 is executing, is operable to provide error information, and/or before a user logs into IHS 110, among others. In one example, the one or more errors may be detected via a POST. For instance, IHSFW 172 may include the POST. In a second example, IHSFW 172 may detect the one or more errors may be detected outside the POST. In another example, the one or more errors may be associated with device 198. In one example, device 198 may be damaged or otherwise defective or impaired. In another example, a cable coupling device 198 to IHS 110 198 may be damaged or otherwise defective or impaired. In one or more embodiments, EC 190 may receive information associated with one or more errors of IHS 110. For example, EC 190 may receive the information associated with the one or more errors from IHSFW 172.

In one or more embodiments, EC 190 may store the information associated with the one or more errors that were detected. For example, EC 190 may store the information associated with the one or more errors via one or more memory media. For instance, EC 190 may store information associated with the error via one or more of volatile memory medium 250, non-volatile memory medium 260, volatile memory medium 150, non-volatile memory medium 160, and non-volatile memory medium 170, among others. In one or more embodiments, EC 190 may store the information associated with the one or more errors via a data structure.

In one or more embodiments, OS 162 may query EC 190 for information associated with any errors that were detected. In one example, OS 162 may utilize MIE 163 to query EC 190 for the information associated with any errors that were detected. In a second example, OS 162 may query EC 190 for the information associated with any errors that were detected after OS 162 is executing via processor 120 or after OS 162 is executing via processor 120 and has achieved a point of execution where OS 162 may utilize and/or process the information associated with any errors that were detected. In another example, OS 162 may query EC 190 for the information associated with any errors that were detected after a user has logged in. For instance, OS 162 or an APP (e.g., an APP of APPs 164-168) may provide the information associated with the one or more errors to the user.

In one or more embodiments, at least one of the one or more errors may no longer exist and/or may no longer be an issue. In one example, a different power source may be coupled to IHS 110, such that the different power source provides enough energy such that an internal battery of IHS 110 may no longer be needed to power or power-in-part IHS 110. In another example, device 198 may be decoupled from IHS 110. In one or more embodiments, EC 190 may receive information indicating that the at least one of the one or more errors may no longer exist and/or may no longer be an issue. For example, if EC 190 receives or determines the information indicating that the at least one of the one or more errors are no longer exist and/or may no longer be an issue, EC 190 may remove information associated with the at least one of the one or more errors. In one instance, EC 190 may overwrite a portion of the one or more memory media that store the information associated with the at least one of the one or more errors. In another instance, EC 190 may modify the data structure that stores the information associated with the at least one of the one or more errors.

Figure 3:
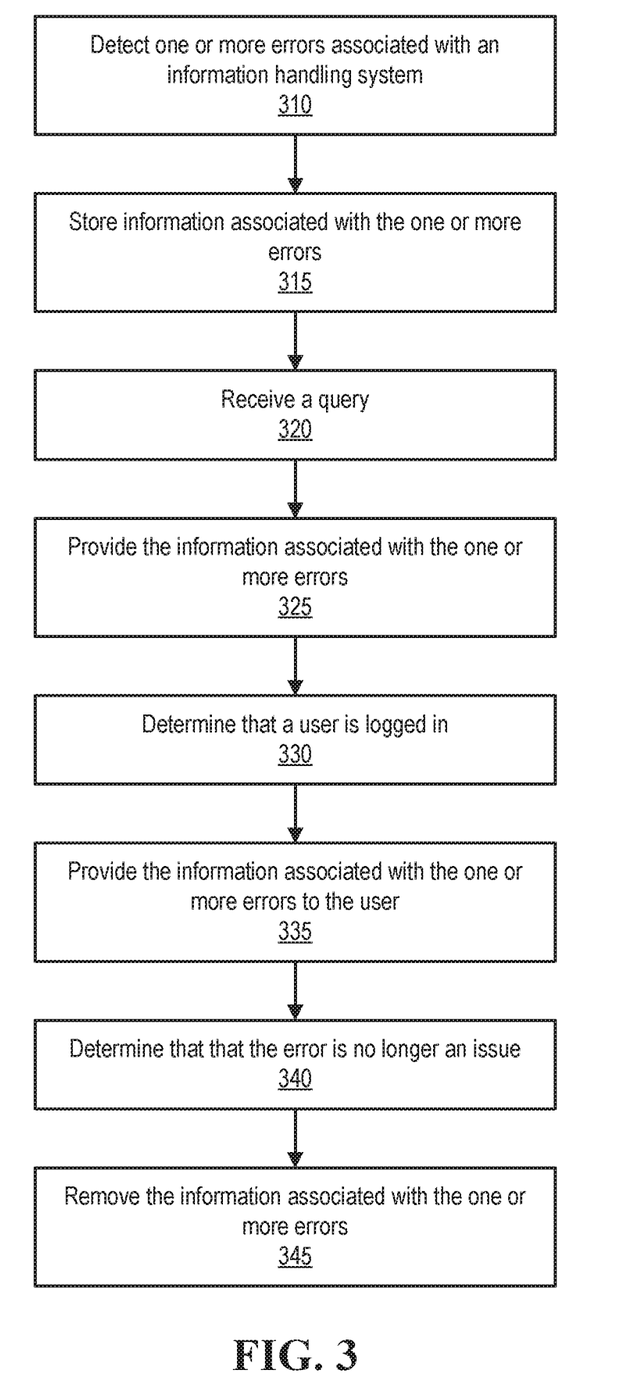
FIG. 3 illustrates a method of operating an information handling system, according to one or more embodiments.

Turning now to FIG. 3, a method of operating an information handling system is illustrated, according to one or more embodiments. At 310, an error associated with an information handling system may be detected before an OS, executed via a processor of the information handling system, is operable to provide information associated with the error. In one or more embodiments, the OS may be operable to provide the information associated with the error at a point after the processor starts executing the OS. In one example, the point after the processor starts executing the OS where the OS is operable to provide the information associated with the error may include a point in executing the OS where the OS may communicate the information associated with the error. In one instance, the point in executing the OS where the OS may communicate the information associated with the error may include where the OS is operable to communicate via a port (e.g., a serial port, a network interface, etc.) of the information handling system. In another instance, the point in executing the OS where the OS may communicate the information associated with the error may include where the OS is operable to communicate the information associated with the error with a user. In one or more embodiments, the OS may be operable to communicate the information associated with the error with a user after the user logs in.

In one or more embodiments, EC 190 may detect an error associated with information handling system 110 before OS 162, executed via processor 120, is operable to provide information associated with the error. In one example, the error may occur during one or more of a POST and a boot-up sequence, among others. In another example, the error may occur after OS 162 starts executing and before the user is logged in (e.g., before the error can be displayed to the user). In one or more embodiments, the error associated with information handling system 110 may be associated with a device coupled to information handling system 110. For example, the error associated with information handling system 110 may be associated with device 198 coupled to information handling system 110.

At 315, information associated with the error may be stored. For example, EC 190 may store information associated with the error. In one instance, EC 190 may store information associated with the error via one or more memory media. In another instance, EC 190 may store information associated with the error via a data structure.

At 320, a query may be received. In one or more embodiments, a query may be received from a management information exchange. In one example, EC 190 may receive the query from MIE 163. In another example, EC 190 may receive the query from IHSFW 172. For instance, OS 162 may query EC 190 via querying MIE 163, which may query IHSFW 172, which may query EC 190. In one or more embodiments, OS 162 may query EC 190 after OS 162 is executing.

At 325, the information associated with the error may be provided. In one example, EC 190 may provide the information associated with the error to IHSFW 172. In a second example, EC 190 may provide the information associated with the error to MIE 163. In another example, EC 190 may provide the information associated with the error to OS 162. For instance, EC 190 providing the information associated with the error to OS 162 may include EC 190 providing the information associated with the error to IHSFW 172 which may provide the information associated with the error to MIE 163 which may provide the information associated with the error to OS 162. In one or more embodiments, providing the information associated with the error may include providing the information associated with the error to OS 162 when OS 162 is operable to provide the information associated with the error. For example, providing the information associated with the error may be performed in response to receiving the query from at least one of IHSFW 172, MIE 163, and OS 162.

At 330, it may be determined that the user is logged in. For example, OS 162, executing via processor 120, may determine that the user is logged in. In one or more embodiments, determining that the user is logged in may permit the information associated with the error to be provided to the user. At 335, the information associated with the error may be provided to the user. For example, the OS may provide the information associated with the error. In one instance, OS 162 may provide the information associated with the error via a display associated with information handling system 110. In another instance, OS 162 may provide the information associated with the error via a sound-producing device associated with information handling system 110.

At 340, it may be determined that the error is no longer an issue. In one example, EC 190 may determine that the error is resolved and/or is no longer an issue. In another example, the error may be associated with device 198 coupled to information handling system 110. For instance, EC 190 may determine that device 198 is not coupled to information handling system 110 and determine that the error is no longer an issue based on determining that device 198 is not coupled to information handling system 110.

At 345, the information associated with the error may be removed. In one example, EC 190 may remove the information associated with the error from the one or more memory media. In another example, OS 162 may remove the information associated with the error. In one instance, OS 162 may remove the information associated with the error from the display associated with information handling system 110. In another instance, OS 162 may no longer cause the sound-producing device associated with information handling system 110 to produce sounds associated with the error. In one or more embodiments, removing the information associated with the error may include modifying the one or more memory media that stores the information associated with the error. In one example, EC 190 may modify a data structure that stores the information associated with the error. In one instance, EC 190 may modify a flag and/or attribute, associated with the information associated with the error, of the data structure that stores the information associated with the error. In a second instance, EC 190 may overwrite one or more portions of the information associated with the error.

Although the description with reference to FIG. 3 describes an error, an event or other information may be substituted for an "error", according to one or more embodiments. For example, EC 190 may store information that is not necessary associated with an error and/or an error condition. In one instance, a POST event and/or information associated with the POST event may be may be substituted for an "error" in the description with reference to FIG. 3. In another instance, information associated with a boot sequence may be may be substituted for an "error" in the description with reference to FIG. 3. In one or more embodiments, information from one or more of the POST and the boot sequence, among others, may be utilized in "playing back" information associated with a period of time of IHS 110 performing one or more actions.

Figure 4:
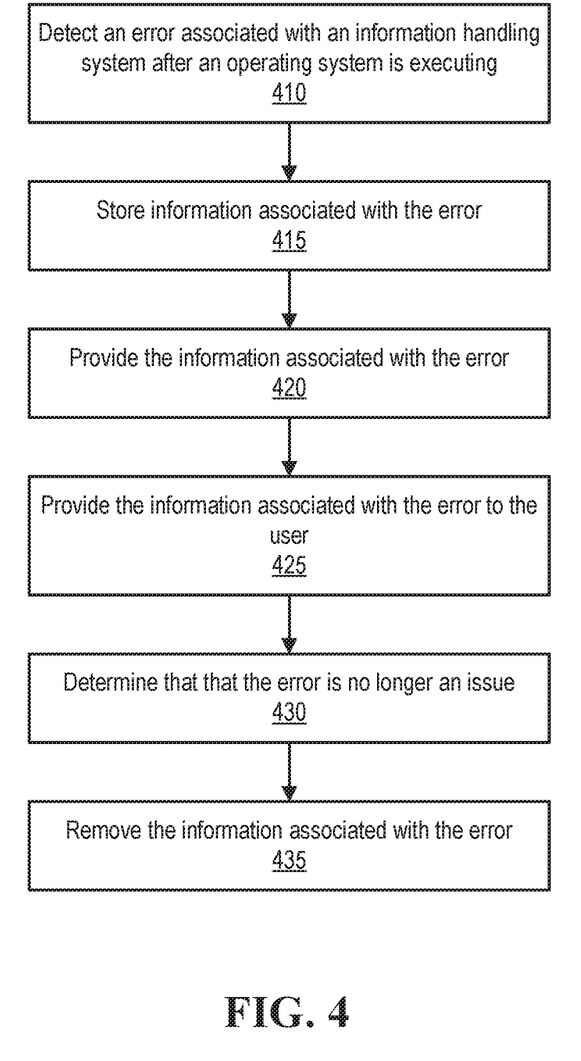
FIG. 4 illustrates another method of operating an information handling system, according to one or more embodiments.

Turning now to FIG. 4, another method of operating an information handling system is illustrated, according to one or more embodiments. At 410, an error associated with an information handling system may be detected after an OS is executing. In one example, EC 190 may detect an error associated with information handling system 110 after OS 162 is executing. In one or more embodiments, the error associated with information handling system 110 may be associated with a device coupled to information handling system 110. For example, the error associated with information handling system 110 may be associated with device 198 coupled to information handling system 110.

At 415, information associated with the error may be stored. For example, EC 190 may store information associated with the error. In one instance, EC 190 may store information associated with the error via a one or more memory media. In another instance, EC 190 may store information associated with the error via a data structure.

At 420, the information associated with the error may be provided. In one example, EC 190 may provide the information associated with the error to IHSFW 172. In a second example, EC 190 may provide the information associated with the error to MIE 163. In another example, EC 190 may provide the information associated with the error to OS 162. For instance, EC 190 providing the information associated with the error to OS 162 may include EC 190 providing the information associated with the error to IHSFW 172 which may provide the information associated with the error to MIE 163 which may provide the information associated with the error to OS 162.

In one or more embodiments, EC 190 may provide the information associated with the error to OS 162 upon detection of the error. For example, upon detection of the error may include a period of time transpiring between detecting the error and providing the information associated with the error to OS 162. In one instance, the period of time transpiring may be small. In another instance, the period of time transpiring may be within a few seconds.

At 425, the information associated with the error may be provided to the user. For example, the OS may provide the information associated with the error. In one instance, OS 162 may provide the information associated with the error via a display associated with information handling system 110. In another instance, OS 162 may provide the information associated with the error via a sound-producing device associated with information handling system 110.

At 430, it may be determined that the error is no longer an issue. In one example, EC 190 may determine that the error is resolved and/or is no longer an issue. In another example, the error may be associated with device 198 coupled to information handling system 110. For instance, EC 190 may determine that device 198 is not coupled to information handling system 110 and determine that the error is no longer an issue based on determining that device 198 is not coupled to information handling system 110.

At 435, the information associated with the error may be removed. In one example, EC 190 may remove the information associated with the error from the one or more memory media that store the information associated with the error. In another example, OS 162 may remove the information associated with the error. In one instance, OS 162 may remove the information associated with the error from the display associated with information handling system 110. In another instance, OS 162 may no longer cause the sound-producing device associated with information handling system 110 to produce sounds associated with the error. In one or more embodiments, removing the information associated with the error may include modifying the one or more memory media that store the information associated with the error. In one example, EC 190 may modify a data structure that stores the information associated with the error. In one instance, EC 190 may modify a flag and/or attribute, associated with the information associated with the error, of the data structure that stores the information associated with the error. In a second instance, EC 190 may overwrite one or more portions of the information associated with the error.

Although the description with reference to FIG. 4 describes an error, an event or other information may be substituted for an "error", according to one or more embodiments. For example, EC 190 may store information that is not necessary associated with an error and/or an error condition. For instance, an even event and/or information associated with the event may be may be substituted for an "error" in the description with reference to FIG. 4. In one or more embodiments, information from OS 162 executing may be utilized in "playing back" information associated with a period of time of IHS 110 performing one or more actions.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   a processor;
   a first memory medium, coupled to the processor, that stores instructions, which include an operating system, executable by the processor;
   an input/output (I/O) port in communication with the processor; and
   an embedded controller coupled to the processor;
   wherein the embedded controller:
      detects an error associated with a first power source coupled to the I/O port of the information handling system before the operating system is operable to provide information associated with the error;
      stores the information associated with the error via a second memory medium;
      provides the information associated with the error to the operating system when the operating system is operable to provide the information associated with the error,
      determines that a second power source is coupled to the I/O port after detecting the error associated with the first power source coupled to the I/O port; and
      in response to determining that the second power source is coupled to the I/O port after detecting the error associated with the first power source coupled to the I/O port, removes the error from the second memory medium.

2. The information handling system of claim 1,
   wherein the embedded controller receives a query from the operating system that executes via the processor; and
   wherein the embedded controller provides the information associated with the error to the operating system in response to receiving the query from the operating system.

3. The information handling system of claim 1,
   wherein the operating system utilizes a management information exchange that permits communications between the operating system and the embedded controller; and
   wherein the management information exchange includes at least one of a Windows Management Interface (WMI) and a Common Information Model (CIM).

4. The information handling system of claim 1,
   wherein the embedded controller detects another error after the operating system is executing via the processor; and
   wherein the embedded controller provides information associated with the other error to the operating system upon detection of the other error.

5. The information handling system of claim 1,
wherein the operating system, executing via the processor, queries a management information exchange; and
wherein the operating system, executing via the processor, receives the information associated with the error via the management information exchange.

6. The information handling system of claim 1,
wherein the operating system, executing via the processor, determines that a user is logged in;
wherein after the operating system determines that the user is logged in, the operating system queries the embedded controller for information associated with at least one of the error, a power-on self-test (POST) event, and a boot sequence.

7. The information handling system of claim 6, wherein the POST event includes the error.

8. The information handling system of claim 1,
wherein the embedded controller determines that the error is at least one of resolved and no longer an issue; and
wherein the embedded controller removes the error from the second memory medium in response to determining that the error is at least one of resolved and no longer the issue.

9. The information handling system of claim 1, wherein when the embedded controller stores the information associated with the error via the second memory medium, the embedded controller stores the information associated with the error via a data structure.

10. The information handling system of claim 1, wherein the second memory medium is the first memory medium.

11. A method of operating an information handling system, comprising:
an embedded controller of the information handling system detecting an error associated with a first power source coupled to an input/output (I/O) port in communication with a processor of the information handling system before an operating system, executable via the processor of the information handling system, is operable to provide information associated with the error;
the embedded controller storing the information associated with the error via a memory medium;
the embedded controller providing the information associated with the error to the operating system when the operating system is operable to provide the information associated with the error,
the embedded controller determining that a second power source is coupled to the I/O port after detecting the error associated with the first power source coupled to the I/O port; and
the embedded controller, in response to determining that the second power source is coupled to the I/O port after detecting the error associated with the first power source coupled to the I/O port, removing the error from the memory medium.

12. The method of claim 11, further comprising:
the embedded controller receiving a query from operating system executing via the processor.

13. The method of claim 11,
wherein the operating system utilizes a management information exchange, executing via the processor, that permits communications between the operating system and the embedded controller; and
wherein the management information exchange includes at least one of a Windows Management Interface (WMI) and a Common Information Model (CIM).

14. The method of claim 11, further comprising:
the embedded controller detecting another error after the operating system is executing; and
the embedded controller providing information associated with the other error to the operating system upon detection of the other error.

15. The method of claim 14, further comprising:
determining that the user is logged in;
after the determining that a user is logged in, the operating system, executing via the processor, querying the embedded controller for information associated with at least one of the error, a power-on self-test (POST) event, and a boot sequence.

16. The method of claim 15, wherein the POST event includes the error.

17. The method of claim 11, further comprising:
the operating system, executing via the processor, querying a management information exchange executing via the processor; and
the operating system, executing via the processor, receiving the information associated with the error via the management information exchange executing via the processor.

18. The method of claim 11, further comprising:
determining that the error is at least one of resolved and no longer an issue; and
in response to the determining that the error is at least one of resolved and no longer the issue, removing the error from the memory medium.

* * * * *